United States Patent [19]

Ohya

[11] 4,348,046
[45] Sep. 7, 1982

[54] REAR SIDE DOOR STRUCTURE FOR A FOUR-DOOR TYPE AUTOMOBILE

[75] Inventor: Takeji Ohya, Hiroshima, Japan

[73] Assignee: Toyo Kogyo Co., Ltd., Hiroshima, Japan

[21] Appl. No.: 168,703

[22] Filed: Jul. 14, 1980

[30] Foreign Application Priority Data

Jul. 16, 1979 [JP] Japan .................................. 54/90853
Aug. 31, 1979 [JP] Japan ......................... 54/120840[U]
Aug. 31, 1979 [JP] Japan ......................... 54/120841[U]

[51] Int. Cl.³ .............................................. B60J 1/00
[52] U.S. Cl. .................................... 296/201; 49/164; 49/502; 296/202; 296/146
[58] Field of Search ....................... 296/201, 202, 146; 49/502, 169, 164

[56] References Cited

U.S. PATENT DOCUMENTS

| | | | |
|---|---|---|---|
| 2,733,096 | 1/1956 | Waterhouse | 296/202 |
| 2,926,040 | 2/1960 | Kramer | 296/146 |
| 3,035,863 | 5/1962 | Hottle | 296/146 |
| 3,887,227 | 6/1975 | Deckert | 296/146 |

*Primary Examiner*—Joseph F. Peters, Jr.
*Assistant Examiner*—John A. Carroll
*Attorney, Agent, or Firm*—Fleit & Jacobson

[57] ABSTRACT

A rear side door structure for a four-door type automobile including a door panel having an upper hem for defining a lower edge of a window opening, a guide member extending upwardly from the upper hem of the door panel to divide the window opening into a front and rear opening portions, a front and rear glass panels respectively provided in the opening portions. One of the glass panels is fixed to the door panel and the other is movable along the guide member. A cover panel is integrally formed with the door panel to cover the guide member.

10 Claims, 30 Drawing Figures

FIG. I
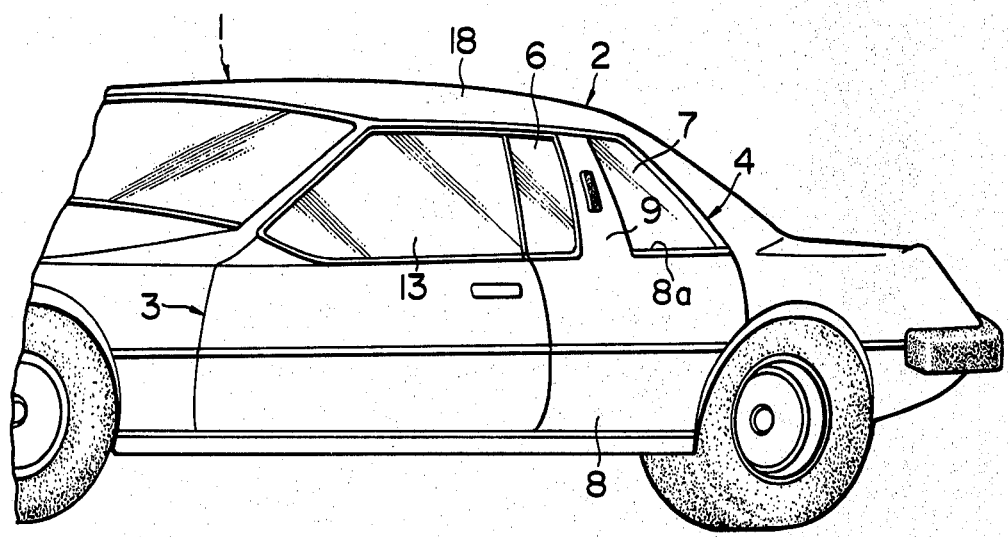
FIG. 2
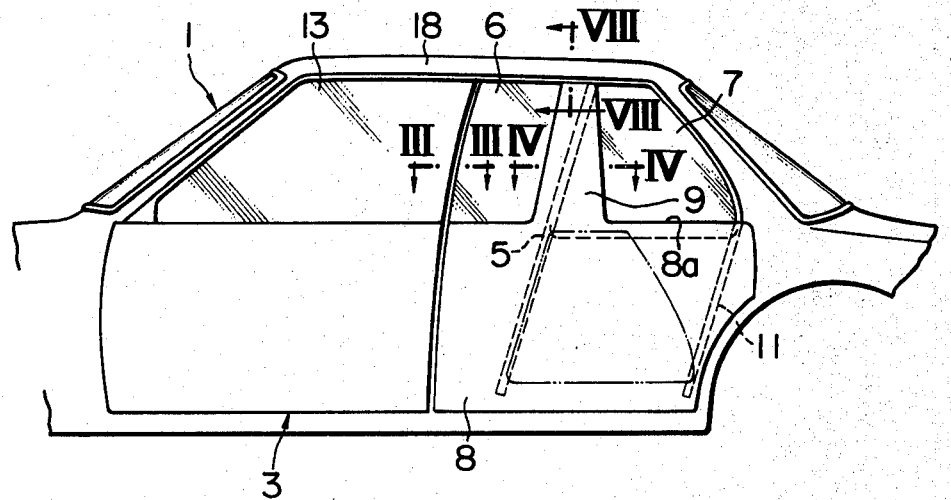

REAR SIDE DOOR STRUCTURE FOR A FOUR-DOOR TYPE AUTOMOBILE

The present invention relates to four-door type automobiles having front and rear side doors, and more particularly to rear side doors therefor. Throughout the specification, the word "four-door" type is used to mean such a type that has four side doors, namely, two front side doors and two rear side doors, and includes a so-called five-door type which has a back door in addition to the four side doors.

In general, passenger cars are classified into two types, namely, two-door type and four-door type. Two door type cars are considered to be advantageous in that they have flexibility in designing their styles, however, inconveniencies have been encountered in that it is required for a passenger to have the front seat back folded forwardly to get into the rear seat space. Four door type cars have no such inconveniencies, however, there is less flexibility in determining their styles as compared with the two-door type cars.

Further, in conventional four-door type cars, the rear side door has a vertically extending guide member which may be referred to as a centering channel and divides the window opening into a front and rear opening portions. The front window glass panel which is adapted to be placed in the front window opening portion is vertically movable along the guide member between a closed position wherein it covers the front opening portion and an open or retracted position wherein it is retracted into the door panel. The rear window glass panel is fitted to the door panel to cover the rear opening portion. The window construction has been adopted mainly because of the fact that the rear side door is cut-off at the rear lower corner portion to avoid interference with the rear tire house and the window glass in the rear side door will not be able to be fully retracted into the door panel if it is not divided into two parts due to a possible interference with the cut-off portion.

In this type of arrangement, however, it is usually required to locate the guide member in such a manner that the width of the front opening portion is larger at the lower portion than at the upper portion mostly from the viewpoint of appearance. In case where the guide member is arranged in parallel with the front edge of the rear side door so that the front window glass be of a substantially constant width, the appearance would be such that the width of the front window opening portion is gradually decreased toward downwardly due to an illusion of an investigator. In order to avoid such poor appearance, it is recommendable to increase the width of the front opening portion toward downwardly as described above. However, such a configuration is disadvantageous in that a single arm type window regulator cannot be used for actuating the front window glass panel but use must be made of a complicated and expensive X-shaped arm type or parallelogram linkage type window regulator.

It is therefore an object of the present invention to provide a rear side door structure for an automobile which is simple in construction and has a good appearance.

Another object of the present invention is to provide a rear side door structure which is suitable for a hard-top type car.

A further object of the present invention is to provide rear side door structures which can well be brought into sealing engagement with weather strips without locally changing their cross-sections even when the door is designed for hard-top type cars.

Still further object of the present invention is to provide a rear side door structure which has an improved appearance.

According to the present invention, the above and other objects can be accomplished by a rear side door structure for an automobile, which comprises a rear door panel assembly having an upper hem for defining a lower edge of a window opening, guide means extending upwardly from the upper hem of the door panel assembly for dividing the window opening into a front opening portion and a rear opening portion, a transparent front glass panel disposed in said front opening portion, a transparent rear glass panel disposed in said rear opening portion, one of said front and rear glass panels being movable along the guide means so that it can be retracted into the door panel assembly, said door panel assembly being provided with cover means which is located to cover said guide means. In order to provide the rear seat passenger with comfort, it is desirable to make the rear window glass panel retractable.

Where the present invention is embodied in a sashless type rear side door wherein the window frames or sashes are not provided for the glass panels, weather-tight seal is provided by putting the glass panels into contact with the weather seal strip which is provided along the periphery of the door opening in the automobile body. In this arrangement, it is preferable to have the front and rear window glass panels to extend upwardly beyond the upper edge of the guide member, and to provide a sealing member in a space formed above the upper edge of the guide member between the front and rear window glass panels.

In a further aspect of the present invention, a window frame or sash is provided around the rear opening portion and the rear window glass panel is made retractable. The front window glass panel is fixed to the door panel and at least the front edge thereof is free of window frame. In case where a frame member or window sash is provided along the upper edge of the front window glass panel, the seal member which may be provided along the front edge of the front window glass panel may have a cover portion which is adapted to be fitted to the front end of the frame member along the upper edge of the front window glass panel.

In order that the invention be more clearly understood, descriptions will now be made on preferable embodiments taking reference to accompanying drawings, in which:

FIG. 1 is a fragmentary perspective view of an automobile having a rear side door in accordance with one embodiment of the present invention;

FIG. 2 is a fragmentary side view of the automobile shown in FIG. 1;

Figure 3:
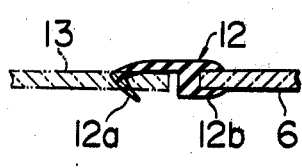
FIGS. 3 and 4 are sectional views respectively taken along the lines III—III and IV—IV in FIG. 2.

Referring now to the drawings, particularly to FIGS. 1 and 2, there is shown a hard-top type automobile 1 which comprises a body 2 provided at each side with a front side door assembly 3 and a rear side door assembly 4. The rear side door assembly 4 includes a door panel 8 having an upper hem 8a for defining the lower edge of the window opening. On the door panel 8, there is provided a guide member 5 which is rearwardly inclined but extends substantially vertically upwardly beyond the upper hem 8a of the door panel 8 to divide the window opening into a front and rear opening portions. In the front opening portion, there is provided a front window glass panel 6 which is in this embodiment fixed to the door panel 8 and the guide member 5. In the rear opening portion, there is provided a rear window glass panel 7 which has a front edge slidably engaged with the guide member 5 so that it can be moved between a closed position wherein it covers the rear opening portion and an open position wherein it is retracted into the door panel 8 as shown by phantom lines in FIG. 2. The door panel 8 is formed with a cover panel 9 which extends upwardly from the hem 8a of the door panel 8 to cover the guide member 5. Further, in order to guide the rear edge of the glass panel 7, the door panel 8 is provided with a rear guide member 11 which extends in parallel with the guide member 5.

It will be noted that the front glass panel 6 is attached at the lower edge to the door panel 8 and at the rear edge to the guide member 5 but the front and upper edges are exposed without being covered by any window frame or sash member. The front side door assembly 3 has a retractable glass panel 13 which is also of a sashless type and has an exposed rear edge which is located adjacent to the front edge of the glass panel 6 with a small clearance therebetween. Referring to FIG. 3, the glass panel 6 on the rear side door assembly 4 is provided along the front edge with a sealing strip 12 having a lip portion 12a and a base portion 12b. The lip portion 12a is adapted to be brought into a sealing contact with the rear edge of the glass panel 13 on the front side door assembly 3 when the door assemblies 3 and 4 are in closed positions.

Figure 4:
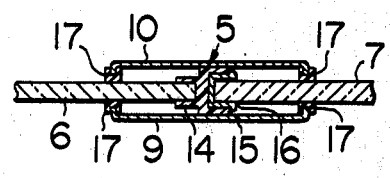

Referring now to FIG. 4, it will be noted that there is an inner cover panel 10 which is substantially in parallel with the outer cover panel 9. The guide member 5 extends between the cover panels 9 and 10 and has a front groove 14 and a rear groove 15. The rear edge of the front window glass panel 6 is fitted to the front groove 14 of the guide member 5. In the rear groove 15, there is provided a run-channel 16 with which the front edge of the rear window glass panel 7 is engaged. Sealing members 17 are provided along the front and rear edges of the outer and inner cover panels 9 and 10.

Figure 5:
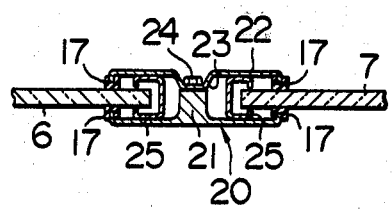
FIGS. 5 through 7 are sectional views similar to FIG. 4 but showing modified forms.

In FIG. 5, there is shown a modification of the structure shown in FIG. 4. In this modification, the outer and inner covers 9 and 10 in the previous example are substituted by an outer and inner cover panels 20 and 22. The outer cover panel 20 is formed with an inwardly projecting ridge 21 and the inner cover 22 with an outward projection 23. The cover panels 20 and 22 are then secured together by means of screws 24 at the ridge 21 and the projection 22. Between the cover panels 20 and 22, there are provided a front and rear channels 25 for engagement with the glass panels 6 and 7, respectively. Sealing members 17 are provided along the front and rear edges of the cover members 20 and 22.

Figure 6:
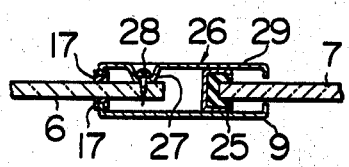

Referring now to FIG. 6, the modification shown therein includes an inner cover panel 26 which extends substantially in parallel with the outer cover 9 and is formed with a projection 27 directed toward the rear edge of the front glass panel 6. The inner cover panel 26 is attached to the glass panel 6 by means of screws 28. Between the cover panels 9 and 26, there is a guide member 25 which has a run-channel 29 for engagement with the front edge of the rear glass panel 7. Sealing members 17 are provided along the front edges of the cover panels 9 and 26.

Figure 7:
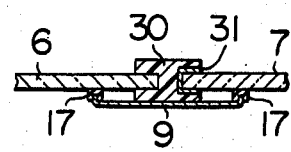

In FIG. 7, there is shown a further modification which includes a guide member 30 of a substantially H-shaped configuration having a front and rear grooves. The guide member 30 is attached to the inner surface of the cover panel 9 and engaged with the rear edge of the front glass panel 6 at the front groove. In the rear groove of the guide member 30, there is provided a run-channel 31 for engagement with the front edge of the rear glass panel 7. Sealing members 17 are provided along the front and rear edges of the cover panel 9.

Figure 8:
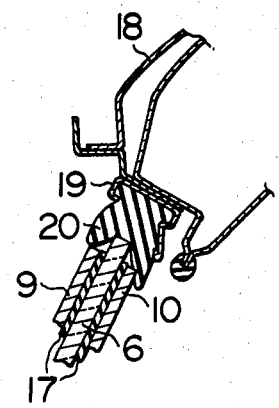
FIG. 8 is a sectional view taken along the line VIII—VIII in FIG. 2.
Figure 9:
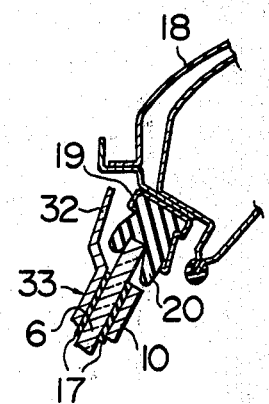
FIG. 9 is a sectional view similar to FIG. 8 but showing a modified form.

Referring now to FIG. 8, it will be noted that the roof panel 18 of the body 2 is provided along the upper periphery of the door opening with a retaining channel 19 to which a weather strip 20 is attached. The glass panel 6 extends upwardly beyond the upper edges of the cover panels 9 and 10 and engages at its upper edge with the weather strip 20. As shown in FIG. 9, the outer cover panel may be substituted by a panel 33 which has an upward overhang portion 32.

Figure 10:
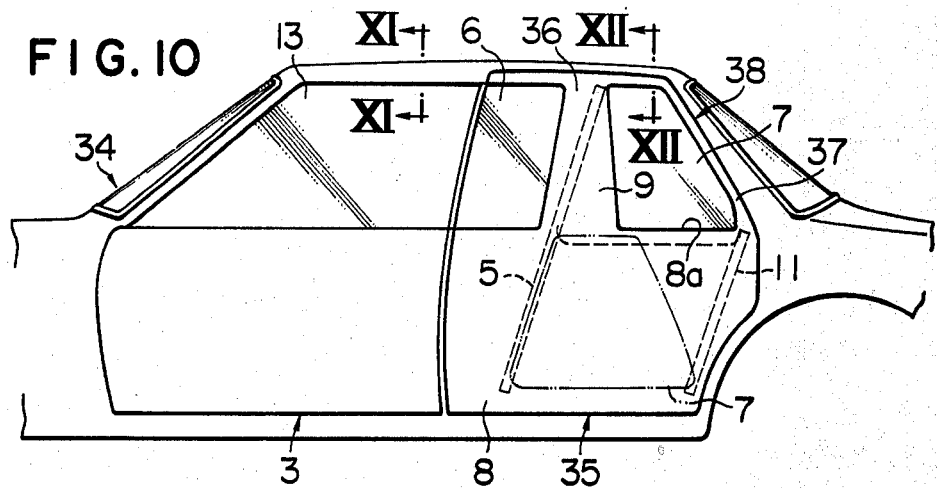
FIG. 10 is a fragmentary side view of an automobile having a rear side door in accordance with another embodiment of the present invention.
Figure 11:
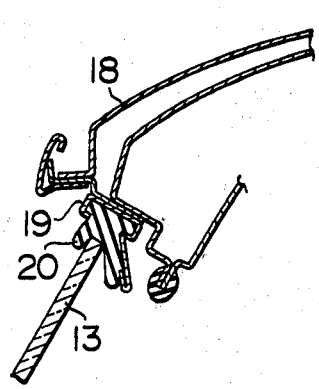
FIGS. 11 and 12 are sectional views respectively taken along the lines XI—XI and XII—XII in FIG. 10.

Referring now to FIG. 10 in which corresponding parts are shown by the same reference numerals as in the previous embodiment, there is shown an automobile 34 having a front side door assembly 3 and a rear side door assembly 35. The rear side door assembly 35 includes a door panel 8 having an upper hem 8a, window glass panels 6 and 7 as well as guide members 5 and 11 as in the embodiment shown in FIG. 2. Further, the door panel 8 is formed with a cover panel 9 for covering the guide member 5. In this embodiment, the door panel 8 is further formed with a frame 38 comprised of an upper frame portion 36 and a rear frame portion 37. The upper frame portion 36 extends forwardly and has a front end substantially flush with the front edge of the front window glass panel 6.

Figure 12:
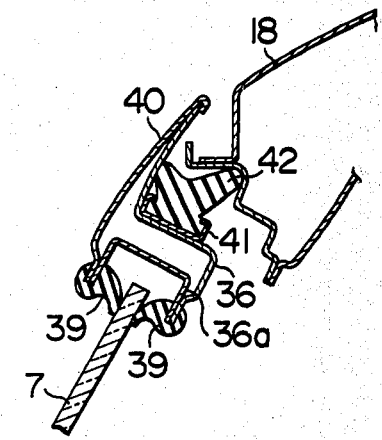

The front side door assembly 3 has a sashless type window glass panel 13 as in the previous embodiment and the upper edge of the glass panel 13 is brought into sealing engagement with a sealing strip 20 provided along the periphery of the roof panel 18 through a retaining channel 19. Referring to FIG. 12, it will be noted that the upper frame portion 36 has a retaining channel 41 secured thereto along the upper surface, and weather strip 42 is attached to the retaining channel 41 so that it is brought into a sealing contact with the periphery of the roof panel 18. The frame portion 36 may be formed with an overhang portion 40 for covering the weather strip 42. The frame portion 36 has a downwardly opened channel 36a along the lower side thereof and sealing strips 39 are provided along the opposite edges of the channel 36a to receive the upper portion of the glass panel 7 therebetween.

Figure 13:
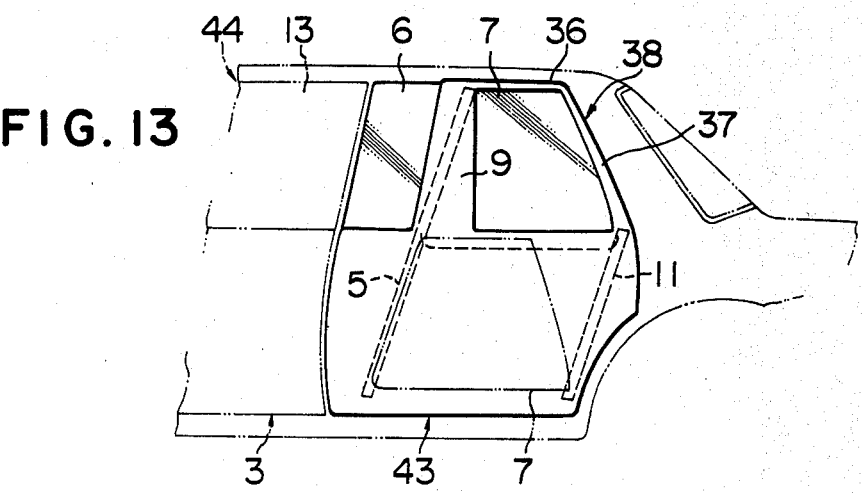
FIG. 13 is a side view of a rear side door in accordance with a further embodiment of the present invention.

Referring now to FIG. 13, there is shown an automobile 44 having a rear side door assembly 43 of a semi-door type. The embodiment is different from the embodiment shown in FIG. 10 in that the upper frame portion 36 of the frame 38 terminates at the cover panel 9. In the embodiments described above, the rear window panel 7 is of a retractable type. This type of arrangement is advantageous in that it is possible to provide a comfortable window opening for the rear seat passenger. Further, it is possible to lower the hem 8a of the door panel 8 and decrease the width of the rear pillar to thereby increase the area of the window opening.

Figure 14:
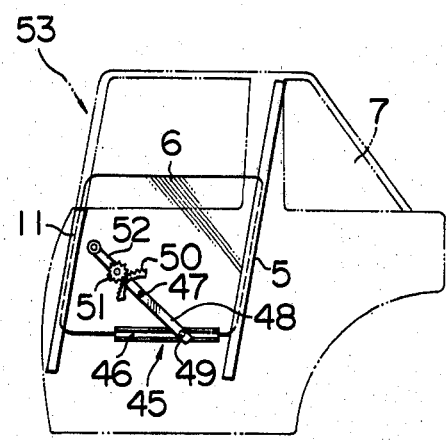
FIG. 14 is a diagrammatical illustration of a window glass actuating mechanism which may be adopted in the rear side door in accordance with the present invention.

Referring to FIG. 14, there is shown a rear side door 53 in which the front window glass panel 6 is retractable while the rear glass panel 7 is fixed. For the purpose, a second guide member 11 is provided along the front edge of the door panel in parallel with the guide member 5. In FIG. 14, there is also shown a window regulator including a channel member 45 attached to the front window glass 6 at the lower edge thereof. On the door panel, there is provided an actuating link 48 which is swingably mounted by means of a pivot shaft 47 and has one end provided with a sector gear 50. An actuating handle 52 is provided with a pinion 51 which is in engagement with the sector gear 50 so that an actuation of the handle 52 causes a rotation of the link 48 about the pivot shaft 47. The channel member 45 has a groove 46 and the link 48 is provided with a roller 49 at the free end for engagement with the groove 46. Thus, the glass panel 6 is moved along the guide members 5 and 11 upon actuation of the handle 52.

In the arrangement shown in FIG. 14, the guide member 5 is substantially parallel with the front window frame and the glass panel 6 is moved along a straight path so that the glass panel 6 can be actuated by a simple single arm type regulator as shown. The regulator mechanism in FIG. 14 may also be adopted in the previous embodiments.

Figure 15:
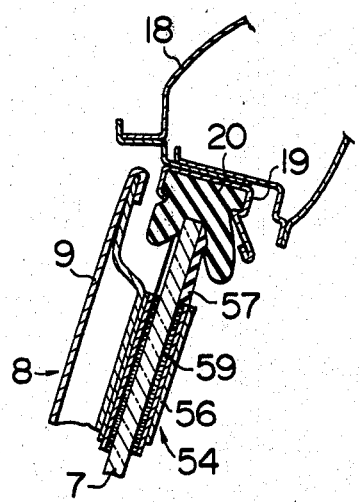
FIG. 15 is a sectional view similar to FIG. 8 but showing another modification.

In FIGS. 15 through 18, there is shown an example of the sealing structure at the upper edges of the glass panels 6 and 7. As shown in FIG. 15, the roof panel 18 is provided along the periphery with a retaining channel 19 to which a weather strip 20 is attached. The upper edges of the glass panels 6 and 7 are in sealing contacts with the weather strip 20. There is a guide member 54 between the glass panels 6 and 7. The guide member 54 includes a front groove 55 for receiving the rear edge of the glass panel 6 and a rear run-channel 56 for slidably receiving the front edge of the glass panel 7. In the run-channel 56, there may be provided a cushion member 59. In the guide member 54, there is further formed a seal retaining groove 58.

Figure 16:
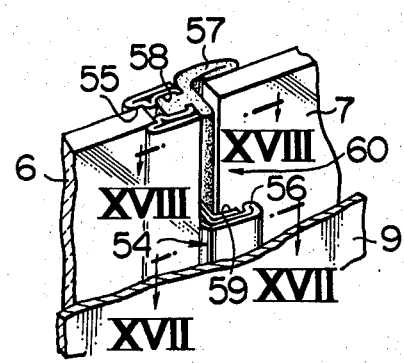
FIG. 16 is a fragmentary perspective view as seen from an upper inside portion to show the upper end structure of the guide member.
Figure 17:
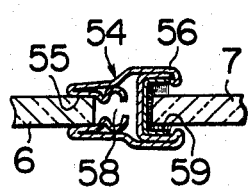
FIGS. 17 and 18 are sectional views respectively taken along the lines XVII—XVII and XVIII—XVIII in FIG. 16.
Figure 18:
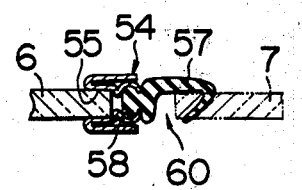

At the upper end portion of the guide member 54, the run-channel 56 is cut-off as clearly shown in FIG. 16 and, in the cut-off portion, there is a sealing member 57 which is retained by the groove 58. Thus, the wider portion, that is, the run-channel portion 56 is cut-off at the upper end portion so that it is possible to bring the upper edges of the glass panels 6 and 7 and the guide member 54 into contact with the weather strip 20 as shown in FIG. 15 without destroying the sealing property even when the weather strip 20 is of a uniform cross-section. The cover panel 9 may be upwardly extended to cover the sealing structure.

Figure 19:
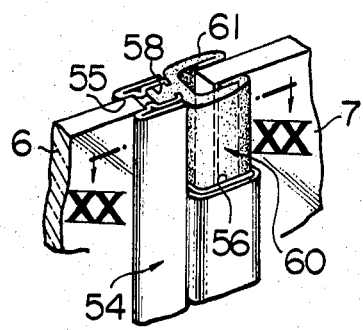
FIG. 19 is a fragmentary perspective view similar to FIG. 16 but showing a modified form.
Figure 20:
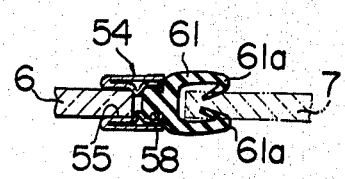
FIG. 20 is a sectional view taken along the line XX—XX in FIG. 19.
Figure 21:
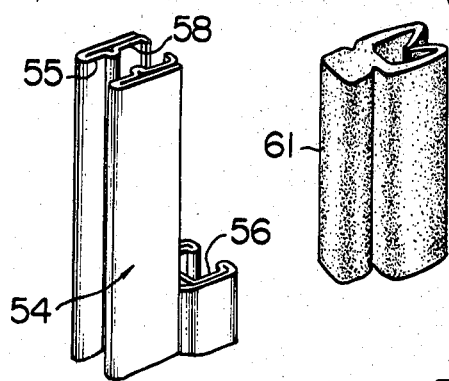
FIG. 21 is an exploded perspective view of the structure shown in FIG. 19.

In FIGS. 19 through 21, there is shown an embodiment in which the sealing member 57 in the previous embodiment is substituted by a sealing member 61. The sealing member 61 is retained in the groove 58 and has a channel-shaped sealing portion 61 formed with a pair of sealing lips 61a. The rear glass panel 7 is slidably engaged at the front edge with the sealing lips 61a.

Figure 22:
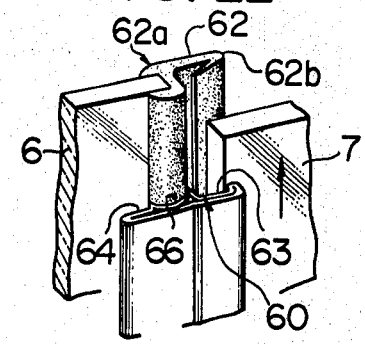
FIG. 22 is a view similar to FIGS. 16 and 19 but showing a further modified form.

In the embodiment shown in FIG. 22, there is shown an arrangement including a guide member 60 which has a run-channel 63, a front groove 64 for receiving the rear edge of the glass panel 6 and a seal retaining groove 66. The guide member 60 terminates with an upper end which is located below the upper edge of the glass panel 6 and a sealing strip 62 is retained by the groove 66 to extend upwardly from the upper edge of the guide member 60. The sealing strip 62 has a front groove 62a which is engaged with the rear edge of the glass panel 6, and a sealing lip 62b which is for slidable engagement with the rear glass panel 7.

Figure 23:
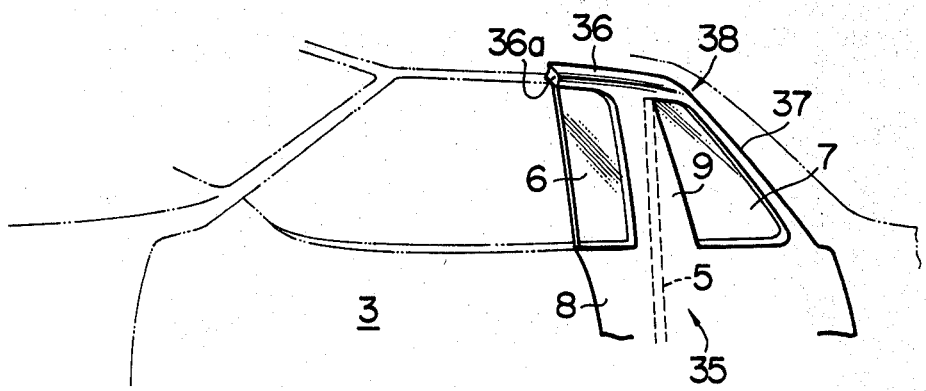
FIG. 23 is a perspective view of a rear door structure in accordance with a further embodiment of the present invention.
Figure 24:
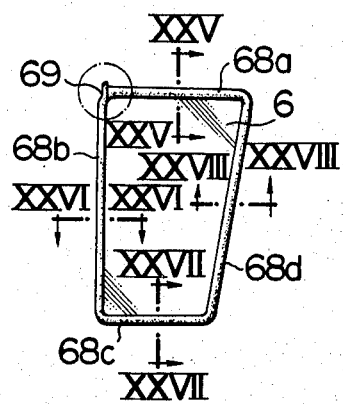
FIG. 24 shows a seal arrangement around the front glass panel.
Figure 25:
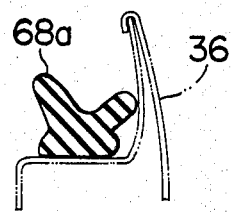
FIGS. 25 through 28 show sectional views respectively taken along the lines XXV—XXV, XXVI—XXVI, XXVII—XXVII and XXVIII—XXVIII, respectively, in FIG. 24.
Figure 26:
Figure 27:
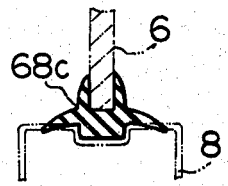
Figure 28:
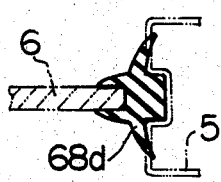
Figure 29:
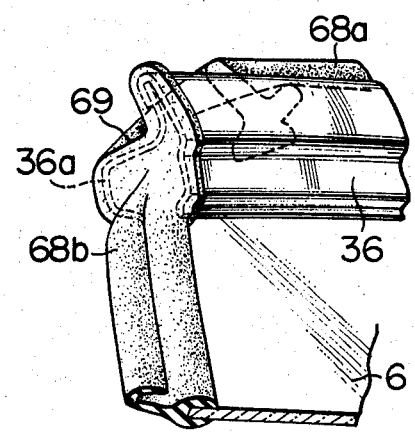
FIG. 29 is a fragmentary perspective view showing the upper front corner portion of the seal arrangement shown in FIG. 24; and, FIG. 30 shows the inside view of the portion shown in FIG. 29.
Figure 30:
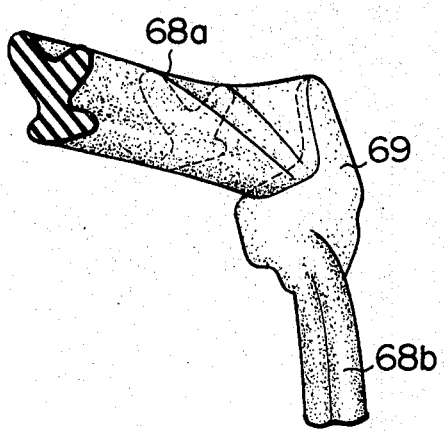

In FIG. 23, there is shown the upper portion of the rear side door assembly 35 adopted in the embodiment shown in FIG. 10. In FIGS. 24 through 28, there are shown seal arrangements around the fixed front glass panel 6. Thus, the seal arrangements include an upper sealing member 68a, a front sealing member 68b, a lower sealing member 68c and a rear sealing member 68d which are of cross-sectional configurations respectively shown in FIGS. 25 through 28. As shown in FIGS. 29 and 30, the front sealing member 68b is formed at the upper end with a cover portion 69 which is adapted to be fitted with and cover the opening which may be formed at the front end 36a of the upper frame portion 36.

The invention has thus been shown and described with reference to specific embodiments, however, it should be noted that the invention is in no way limited to the details of the illustrated structures but changes and modifications may be made without departing from the appended claims.

I claim:

1. A rear side door structure for an automobile which is adapted to be used with a front side door of a sashless type, and which comprises a rear door panel assembly having an upper hem for defining a lower edge of a window opening, guide means extending upwardly from the upper hem of the door panel assembly for dividing the window opening into a front opening portion and a rear opening portion, a transparent front glass panel disposed in said front opening portion, a transparent rear glass panel disposed in said rear opening portion, said rear glass panel being movable along the guide means so that it can be retracted into the door panel assembly, said door panel assembly being provided with cover means which is located to cover said guide means, said front glass panel being fixed to the door panel assembly.

2. A rear side door structure in accordance with claim 1 which is of a sashless type having frameless means around the front and rear glass panels, the glass panels being adapted to be brought into sealing contact at their upper edges with weather strip means provided on an automobile body along a periphery of door opening.

3. A rear side door structure in accordance with claim 2 in which the guide means has an upper edge which is lower than the upper edges of the glass panels, sealing means being provided to extend upwardly from said upper edge of the guide means, said sealing means having a sealing portion adapted for sliding contact with the movable glass panel.

4. A rear side door structure in accordance with claim 3 in which said guide means includes a groove adapted for receiving stationary one of the glass panels and a guide groove for slidably receiving the movable glass panel, said guide groove being wider than the first mentioned groove and cut-off at upper portion thereof to provide a cut-off portion, said sealing means being provided in the cut-off portion.

5. A rear side door structure in accordance with claim 1 wherein frame means is provided for the rear glass panel, at least the front edge of the front glass panel being frameless.

6. A rear side door structure in accordance with claim 5 in which frame means is provided along upper edge of the front glass panel, sealing means being provided along the front edge of the front glass panel and having a cover portion for covering front end of the frame means.

7. A rear side door structure of a sashless type for an automobile which comprises a rear door panel assembly having an upper hem for defining a lower edge of a window opening, guide means extending upwardly from the upper hem of the door panel assembly for dividing the window opening into a front opening portion and a rear opening portion, a transparent front glass panel disposed in said front opening portion, a transparent rear glass panel disposed in said rear opening portion, one of said front and rear glass panels being movable along the guide means so that it can be retracted into the door panel assembly, said door panel assembly being provided with cover means which is located to cover said guide means, there being frameless means around the front and rear glass panels and the glass panels being adapted to be brought into sealing contact at their upper edges with weather strip means provided on an automobile body along a periphery of the door opening.

8. A rear side door structure in accordance with claim 7 in which the guide means has an upper edge which is lower than the upper edges of the glass panels, sealing means being provided to extend upwardly from said upper edge of the guide means, said sealing means having a sealing portion adapted for sliding contact with the movable glass panel.

9. A rear side door structure for an automobile which is adapted to be used with a front side door of a sashless type having at least one glass panel having a rear edge and which comprises a rear door panel assembly having an upper hem for defining a lower edge of a window opening, guide means extending upwardly from the upper hem of the door panel assembly for dividing the window opening into a front opening portion and a rear opening portion, a transparent front glass panel disposed in said front opening portion, a transparent rear glass panel disposed in said rear opening portion, one of said front and rear glass panels being movable along the guide means so that it can be retracted into the door panel assembly, said door panel assembly being provided with cover means which is located to cover said guide means, said front glass panel having a forward edge provided with a sealing member which is adapted to be engaged with said rear edge of the glass panel of the front side door to seal therebetween.

10. A rear side door structure for an automobile adapted to be used with a front side door of a sashless type, which comprises a rear door panel assembly having an upper hem for defining a lower edge of a window opening, guide means extending upwardly from the upper hem of the door panel assembly for dividing the window opening into a front opening portion and a rear opening portion, a transparent front glass panel disposed in said front opening portion, a transparent rear glass panel disposed in said rear opening portion, said rear glass panel being movable along the guide means so that it can be retracted into the door panel assembly and the front glass panel being fixed to the door panel assembly, said door panel assembly being provided with cover means which is located to cover said guide means, and frame means provided for the rear glass panel, at least a front edge of the front glass panel being frameless.

* * * * *